Patented Aug. 29, 1950

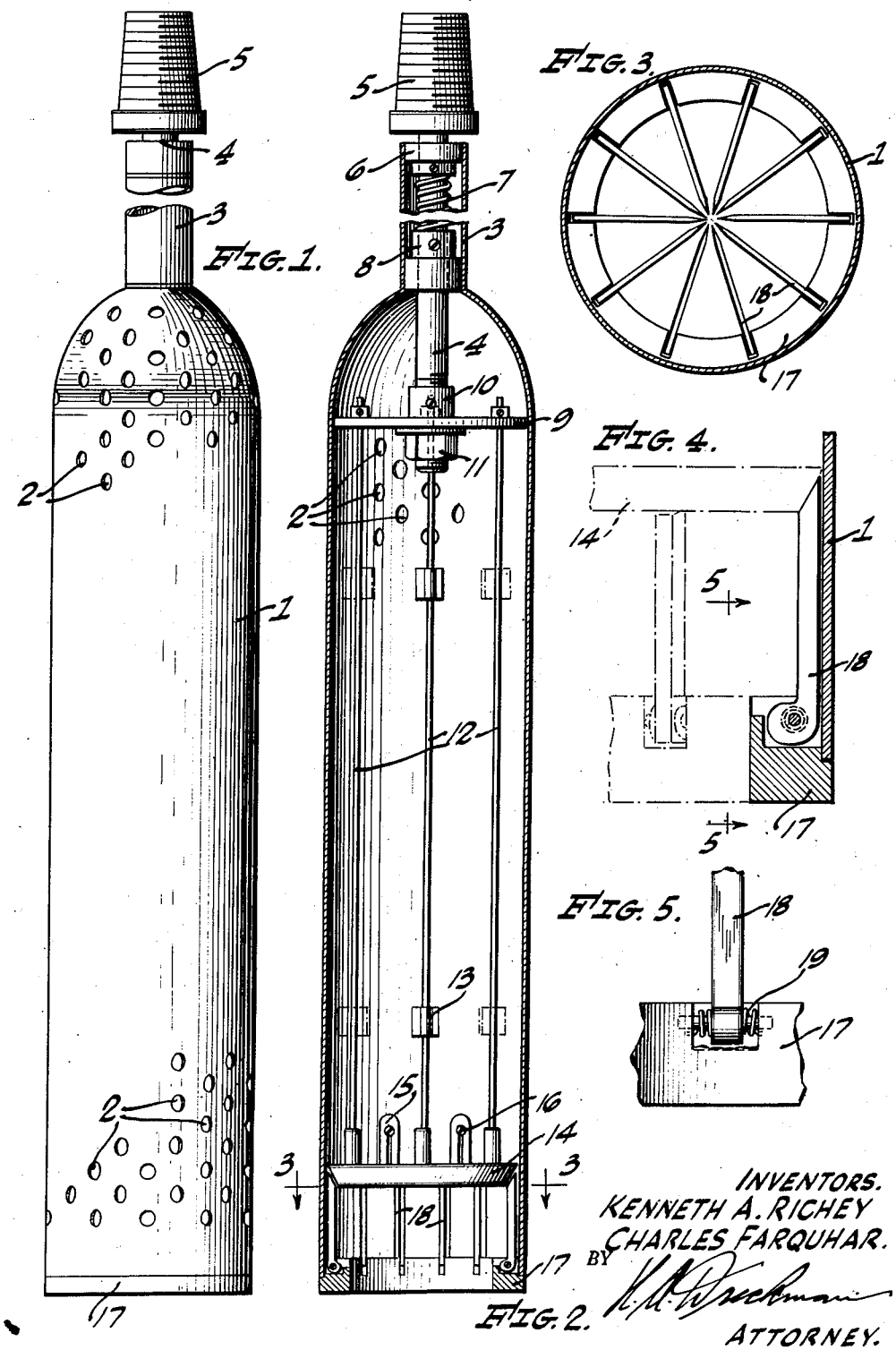

2,520,783

UNITED STATES PATENT OFFICE 2,520,783

TUBULAR TYPE OIL WELL FISHING TOOL

Kenneth A. Richey and Charles Farquhar, Long Beach, Calif.; said Richey assignor to said Farquhar Application August 12, 1948, Serial No. 43,876

6 Claims. (Cl. 294—113)

1

This invention relates to a tubular type oil well fishing tool, which is adapted to be inserted into an oil well for the purpose of recovering various small objects which might be lost in the well.

An object of our invention is to provide a novel tubular type fishing tool, in which a plurality of fingers are held in retarded position. These fingers are tripped and released by the operator at the surface so that the fingers may move to a closed position to entrap the lost article.

Another object of our invention is to provide a novel tubular type fishing tool which is operated on a cable, and a jerk on the cable results in releasing the spring pressed fingers to entrap an article within the tool.

Another object of our invention is to provide a novel tubular type fishing tool in which the closure fingers are effectively held in open position until the operator determines that they shall be closed.

Other objects, advantages and features of invention may appear from the accompanying drawing, the subjoined detailed description and the appended claims.

In the drawing:

Figure 1 is a side elevation of our novel fishing tool.

Figure 2 is a longitudinal sectional view of the same.

Figure 3 is a sectional view taken on line 3—3 of Figure 2, and showing the fingers in closed position.

Figure 4 is an enlarged fragmentary sectional view of the lower part of the tool, and showing the fingers.

Figure 5 is a fragmentary sectional view taken in the direction of the arrows 5—5, in Figure 4.

Referring more particularly to the drawing, the numeral 1, indicates an elongated tubular shell, which may be provided with a large number of holes or perforations 2, through the side thereof, so that fluid may readily pass in and out of the shell. A pipe 3, rises from the upper end of the shell 1, and this pipe acts as a guide and a housing for the shaft 4, extending longitudinally through the pipe and into the top of the shell 1. A fitting 5, is provided in the upper end of the shaft 4, and a rope socket is attached to this fitting so that the entire tool may be suspended on a steel cable of the type which is usually used in the drilling of oil wells.

The shaft 4, extends through bearings 6—6, in the pipe 3, and a coil spring 7, surrounds the

2 shaft and bears against the upper bearing 6, and against a collar 8, on the shaft, thus urging the shaft downwardly at all times. A disc or spider 9, is mounted on the lower end of the shaft 4, and this disc or spider may be adjusted vertically on the shaft 4, by the nuts 10, 11, which screw onto the shaft and bear against either side of the spider. A plurality of rods 12, are secured to the spider or disc 9, at one end, and these rods extend downwardly through the tube 1, through suitable guides 13. The rods are all connected at the lower end to a releasing ring 14. The releasing ring 14, is provided with a number of ears 15, these ears being slotted, and a pin 16, extends through these slots thus guiding the ring 14, in its vertical movement.

A collar 17, is fixedly attached to the bottom of the tubular housing, 1, and a plurality of fingers 18, are pivotly mounted in this collar. Each of these fingers is engaged by a spring 19, which presses the fingers inwardly to the position shown in Figure 3, that is, a closed position. The ring 14, is preferably tapered, and all of the fingers 18, engage the periphery of this ring, as shown in Figures 2 and 4.

When the tool has reached the bottom of the hole, the operator jerks on the suspending cable, which pulls the spider 9, upwardly against the tension of the spring 7. This movement moves the rods upwardly, and also the ring 14. The fingers 18, are now no longer restrained against inward movement, and the springs 19, will press the fingers inwardly to closed position, thus entrapping any article within the tubular housing 1.

Having described our invention, we claim:

1. A tubular type oil well fishing tool comprising a tubular body, a plurality of fingers pivotly mounted within said body, said fingers being normally urged into horizontal position, means engaging said fingers and holding the fingers in vertical position, and suspending means connected to said tubular housing, and to said first named means, whereby the first named means are released from engagement with said fingers.

2. A tubular type oil well fishing tool comprising a tubular body, a plurality of fingers pivotly mounted in said body, means urging said fingers into horizontal position in the body, a ring engaging said fingers and holding the fingers in vertical position, suspending means extending into said tubular body, and means connecting said suspending means and said ring whereby the ring is moved vertically to release the fingers.

3. A tubular type oil well fishing tool comprising a tubular body, a plurality of fingers pivotly mounted in said body, means urging said fingers into horizontal position in the body, a ring engaging said fingers and holding the fingers in vertical position, a suspending shaft slidably mounted in said tubular body, spring means engaging said shaft and pressing said shaft downwardly into the body, and means connecting said shaft and said ring whereby movement of the shaft will move said ring.

4. A tubular type oil well fishing tool comprising a tubular body, a plurality of fingers pivotly mounted in said body, means urging said fingers into horizontal position in the body, a ring engaging said fingers and holding the fingers in vertical position, a suspending shaft slidably mounted in said tubular body, spring means engaging said shaft and pressing said shaft downwardly into the body, and means connecting said shaft and said ring whereby movement of the shaft will move said ring, said last named means including rods connected at one end to said shaft, and at the other end to said ring.

5. A tubular type oil well fishing tool comprising a body, a plurality of fingers pivotly mounted at the lower end of said body, a spring engaging each of the fingers, and urging the same into horizontal position, a ring in said body engageable with said fingers to hold the fingers in vertical position, a shaft slidably mounted in the upper end of said housing, a spring engaging said shaft and urging said shaft downwardly into the housing, and rods connected at one end to said shaft, and at the other end to said ring.

6. A tubular type oil well fishing tool comprising a body, a plurality of fingers pivotly mounted at the lower end of said body, a spring engaging each of the fingers, and urging the same into horizontal position, a ring in said body engageable with said fingers to hold the fingers in vertical position, a shaft slidably mounted in the upper end of said housing, a spring engaging said shaft and urging said shaft downwardly into the housing, a spider mounted on said shaft within the housing, and rods secured at one end to said spider and at the other end to said ring.

KENNETH A. RICHEY.
CHARLES FARQUHAR.

REFERENCES CITED

The following references are of record in the file of this patent:

UNITED STATES PATENTS

| Number | Name | Date |
|---|---|---|
| 2,184,343 | Harrington | Dec. 26, 1939 |